US00RE48220E

(19) United States
(12) Reissued Patent
Durante et al.

(10) Patent Number: US RE48,220 E
(45) Date of Reissued Patent: Sep. 22, 2020

(54) EMBEDDING PHOTOCATALYTIC TITANIUM DIOXIDE IN ASPHALT SURFACES TO REDUCE POLLUTANTS VIA PHOTOCATALYTIC REACTIONS

(71) Applicant: D&D Emulsions, Inc., Mansfield, OH (US)

(72) Inventors: Colin Durante, Mansfield, OH (US); Delbert L. Dawson, Mansfield, OH (US)

(73) Assignee: D&D Emulsions, Inc., Mansfield, OH (US)

(21) Appl. No.: 16/169,675

(22) Filed: Oct. 24, 2018

Related U.S. Patent Documents

Reissue of:
(64) Patent No.: 9,303,369
Issued: Apr. 5, 2016
Appl. No.: 14/557,933
Filed: Dec. 2, 2014

U.S. Applications:
(63) Continuation-in-part of application No. 14/207,387, filed on Mar. 12, 2014, now Pat. No. 8,899,871.
(Continued)

(51) Int. Cl.

| | |
|---|---|
| ***E01C 11/00*** | (2006.01) |
| ***E01C 23/06*** | (2006.01) |
| ***C04B 41/00*** | (2006.01) |
| ***C04B 41/50*** | (2006.01) |
| ***C04B 41/65*** | (2006.01) |
| ***E01C 1/00*** | (2006.01) |
| ***E01C 7/35*** | (2006.01) |

(Continued)

(52) U.S. Cl.
CPC ..... *E01C 11/005* (2013.01); *C04B 41/009* (2013.01); *C04B 41/5041* (2013.01); *C04B 41/65* (2013.01); *E01C 1/005* (2013.01); *E01C 7/353* (2013.01); *E01C 7/358* (2013.01); *E01C 23/06* (2013.01); *B01J 21/063* (2013.01); *B01J 35/004* (2013.01); *C04B 2111/00827* (2013.01); *Y02A 30/333* (2018.01)

(58) Field of Classification Search
CPC . C04B 41/5041; C04B 41/65; C04B 41/5089; C04B 41/009; C04B 28/02; C04B 41/4539; C04B 41/4549; C04B 41/457; C04B 2111/00827; B01J 21/063; B01J 35/004
See application file for complete search history.

(56) References Cited

U.S. PATENT DOCUMENTS 4,663,300 A * 5/1987 Lester et al. ..... 502/66
6,454,489 B1 * 9/2002 Murata et al. ..... C04B 14/305 404/17

(Continued)

FOREIGN PATENT DOCUMENTS

CA 2836195 A1 3/2006

*Primary Examiner* — Ling X Xu
(74) *Attorney, Agent, or Firm* — Keith Kline; The Kline Law Firm PC

(57) ABSTRACT

Methods for embedding photocatalytic titanium dioxide in asphalt surfaces to reduce pollutants via photocatalytic reactions include applying an amount of an asphalt surface treatment compound to an upper surface of the asphalt surface, the asphalt surface treatment compound including a mixture of a liquid carrier compound with a titanium dioxide ($TiO_2$) photocatalyst.

12 Claims, 3 Drawing Sheets

Related U.S. Application Data

(60) Provisional application No. 61/780,365, filed on Mar. 13, 2013.

(51) Int. Cl.

| | |
|---|---|
| *B01J 21/06* | (2006.01) |
| *B01J 35/00* | (2006.01) |
| *C04B 111/00* | (2006.01) |

(56) References Cited

U.S. PATENT DOCUMENTS

| | | | | |
|---|---|---|---|---|
| 8,404,204 | B2 * | 3/2013 | Sergi et al. | 423/239.1 |
| 2005/0159309 | A1 * | 7/2005 | Hubbell et al. | E01F 15/0423 502/439 |
| 2006/0204331 | A1 * | 9/2006 | Hall et al. | E01C 23/0885 404/75 |
| 2007/0017417 | A1 * | 1/2007 | Terruzzi | C04B 28/02 106/622 |
| 2007/0077406 | A1 * | 4/2007 | Jacobs et al. | 428/304.4 |
| 2007/0207302 | A1 * | 9/2007 | Cucitore et al. | 428/292.1 |
| 2007/0219288 | A1 * | 9/2007 | Godi et al. | C04B 26/02 523/122 |
| 2009/0061246 | A1 * | 3/2009 | Maltby et al. | 428/500 |
| 2010/0190633 | A1 * | 7/2010 | Bai et al. | 502/63 |
| 2010/0319577 | A1 * | 12/2010 | Naidoo et al. | 106/235 |
| 2011/0041734 | A1 * | 2/2011 | Guerrini | C04B 28/02 106/671 |
| 2011/0091367 | A1 * | 4/2011 | Sergi et al. | 423/239.1 |
| 2012/0118318 | A1 * | 5/2012 | Hillebrandt Poulsen et al. | 134/1.3 |
| 2012/0165186 | A1 * | 6/2012 | Edwards et al. | 502/350 |
| 2013/0216308 | A1 * | 8/2013 | Weaver | E01C 23/065 404/75 |
| 2014/0363231 | A1 * | 12/2014 | Bartoszek | 404/77 |

* cited by examiner

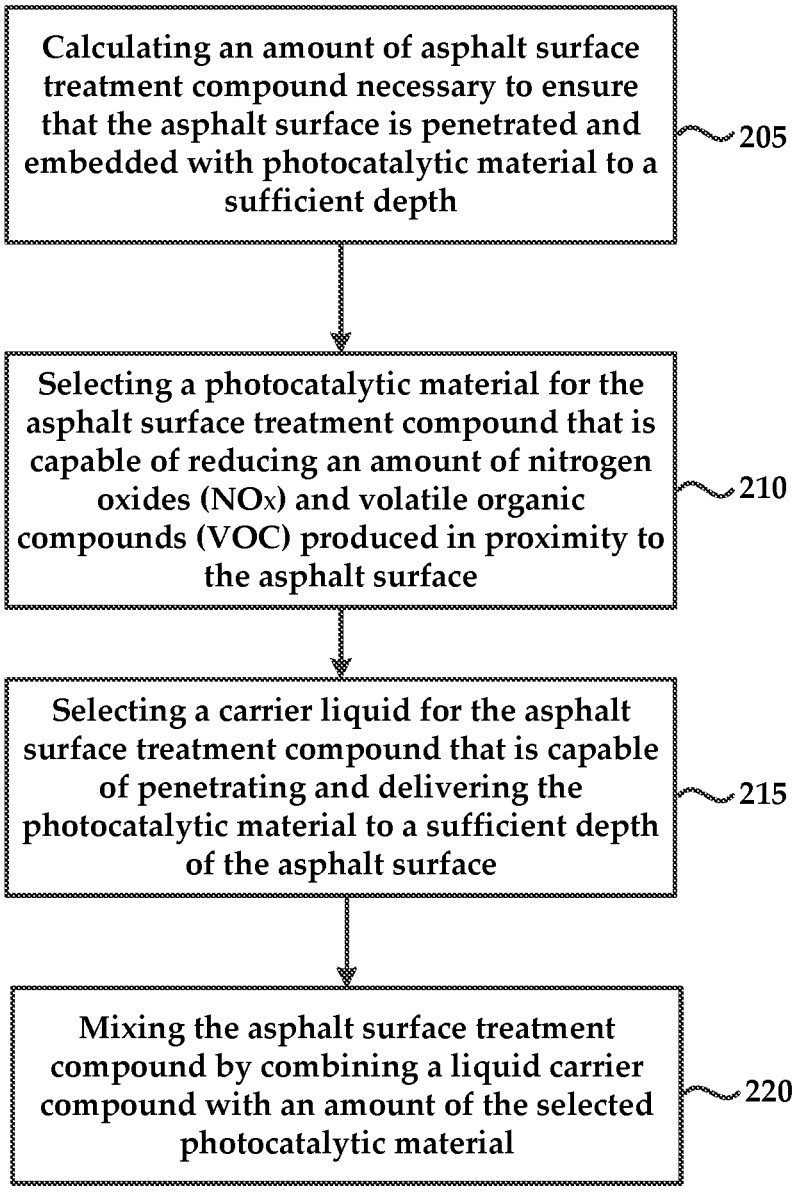
*FIG. 2*
*AMENDED*

EMBEDDING PHOTOCATALYTIC TITANIUM DIOXIDE IN ASPHALT SURFACES TO REDUCE POLLUTANTS VIA PHOTOCATALYTIC REACTIONS

Matter enclosed in heavy brackets [ ] appears in the original patent but forms no part of this reissue specification; matter printed in italics indicates the additions made by reissue; a claim printed with strikethrough indicates that the claim was canceled, disclaimed, or held invalid by a prior post-patent action or proceeding.

CROSS-REFERENCE TO RELATED APPLICATIONS

[This nonprovisional U.S. patent application is a continuation-in-part of U.S. patent application Ser. No. 14/207,387, filed Mar. 12, 2014 and issued on Dec. 2, 2014 as U.S. Pat. No. 8,899,871, entitled "Embedding Photocatalytic Titanium Dioxide in Asphalt Surfaces to Reduce Pollutants via Photocatalytic Reactions," which in turn claims the priority benefit of U.S. provisional patent application No. 61/780, 365 filed on Mar. 13, 2013, the disclosures of which are incorporated by reference herein in its entirety.]

*This patent application is a reissue of U.S. Pat. No. 9,303,369, originally issued on Apr. 5, 2016, based on U.S. application Ser. No. 14/557,933, filed Dec. 2, 2014, which is a continuation-in-part of U.S. patent application Ser. No. 14/207,387, filed Mar. 12, 2014, now U.S. Pat. No. 8,899, 871, and entitled "Embedding Photocatalytic Titanium Dioxide in Asphalt Surfaces to Reduce Pollutants via Photocatalytic Reactions," which in turn claims the priority benefit of U.S. provisional patent application No. 61/780, 365 filed on Mar. 13, 2013, the disclosures of which are incorporated by reference herein in their entirety.*

FIELD OF THE INVENTION

The present technology relates primarily to asphalt road construction, although it can apply to any asphalt pavement. Example methods of impregnating the asphalt with a photocatalytic titanium dioxide catalyst that reacts with nitrogen oxides and other pollutants to chemically alter them into non-hazardous or less hazardous materials through photocatalytic oxidation (PCO) and/or reduction reaction.

SUMMARY

In some embodiments, the preset technology is directed to a method for treating asphalt concrete. The method comprises applying an amount of an asphalt surface treatment compound to an upper surface of the asphalt surface, the asphalt surface treatment compound comprising a mixture of a liquid carrier compound with a titanium dioxide ($TiO_2$) photocatalyst.

In some embodiments, the present technology is directed to a method that includes applying a photocatalytic compound to an asphalt surface, wherein the photocatalytic compound is capable of uniformly penetrating the asphalt surface down to a depth of at least a quarter of an inch relative to an upper surface of the asphalt surface.

In some embodiments, the present technology is directed to an asphalt concrete treatment compound, comprising: an amount of a liquid carrier compound mixed with an amount of a titanium dioxide ($TiO_2$) photocatalyst, wherein the liquid carrier compound is capable of penetrating asphalt concrete down to a depth of at least a quarter of an inch relative to an upper surface of the asphalt concrete.

BRIEF DESCRIPTION OF THE DRAWINGS

The accompanying drawings, where like reference numerals refer to identical or functionally similar elements throughout the separate views, together with the detailed description below, are incorporated in and form part of the specification, and serve to further illustrate embodiments of concepts that include the claimed disclosure, and explain various principles and advantages of those embodiments.

The methods and systems disclosed herein have been represented where appropriate by conventional symbols in the drawings, showing only those specific details that are pertinent to understanding the embodiments of the present disclosure so as not to obscure the disclosure with details that will be readily apparent to those of ordinary skill in the art having the benefit of the description herein

FIG. 2 is a method for preparing the asphalt surface treatment compound that is to be applied to the asphalt surface.

DETAILED DESCRIPTION

Figure 1:
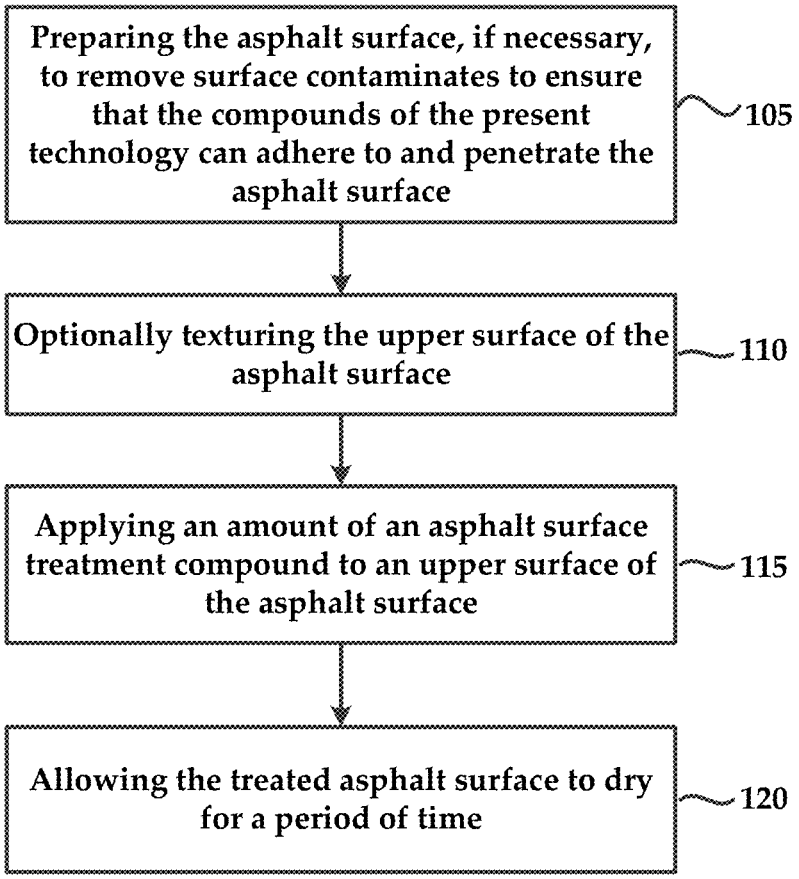
FIG. 1 is a flowchart of an exemplary method of treating *an* asphalt surface to reduce the production of nitrogen oxides ($NO_x$), volatile organic compounds (VOC), and other pollutants [by] *in proximity to* the asphalt surface.

While this technology is susceptible of embodiment in many different forms, there is shown in the drawings and will herein be described in detail several specific embodiments with the understanding that the present disclosure is to be considered as an exemplification of the principles of the technology and is not intended to limit the technology to the embodiments illustrated.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

It will be understood that like or analogous elements and/or components, referred to herein, may be identified throughout the drawings with like reference characters. It will be further understood that several of the figures are merely schematic representations of the present technology. As such, some of the components may have been distorted from their actual scale for pictorial clarity.

The present technology, in some embodiments, is a method of reducing nitrogen oxides ($NO_x$), volatile organic compounds (VOC), and other pollutants by embedding photocatalytic titanium dioxide ($TiO_2$) into in-place asphalt surfaces through the use of penetrating liquid carriers (e.g., asphalt surface treatment compounds) sprayed onto the asphalt surface. The penetrating liquids carry $TiO_2$ nanopartides into the upper layers of an asphalt surface, forming a photocatalytic layer within the asphalt surface that oxidizes $NO_x$ and other pollutants when the treated asphalt surface is exposed to ultraviolet sunlight and airborne $H_2$0 molecules. This process chemically alters the aforementioned pollutants, rendering them non-hazardous to the environment. As the surface (e.g., upper) layer of asphalt wears off due to normal traffic and environmental wear, submerged layers of $TiO_2$ appear at the surface, thus regenerating itself. The asphalt surface treatment compounds also have the advantage of restoring the plasticity and durability of the asphalt binder that may have been lost due to aging or to the heat of the production process, such as while sealing the pavement in order to limit intrusion of air and water.

Generally, an example of an asphalt surface includes asphalt concrete (e.g., blacktop or paving), which is a composite material that includes bitumen (e.g., asphalt) mixed into a mineral aggregate.

As asphalt surface may comprise any product or mixture that comprises an asphalt or bitumen binder, and specifically asphalt surfaces that exude or produce nitrogen oxides ($NO_x$), volatile organic compounds (VOC), and other pollutants.

For context, human beings or other animals that are in close proximity to highways or other roads that are composed of asphalt can be subjected to exposure to nitrogen oxides ($NO_x$) at considerably higher levels than those experienced by the community at large. Studies show that these road microenvironments contribute 35% of the $NO_x$ and 29% of the VOC pollution emitted in the U.S. This is primarily due to emissions from motor vehicles. The U.S. Environmental Protection Agency (EPA) has recently taken these facts into account by modifying their National Ambient Air Quality Standard (NAAQS). Namely, the standards now include a new one hour average 100 parts per billion (ppb) primary standard in addition to the previously implemented 53 ppb annual average requirement of nitrogen dioxide ($NO_2$), the primary pollutant in the $NO_x$ category.

Traditional methods of $NO_x$ reduction (e.g., catalytic converter reduction of motor vehicle emissions) have reached a point of diminishing returns in terms of cost effectiveness, resulting in the need for new and innovative methods of pollutant reduction. A method of reducing these pollutants may be the use of photocatalytic titanium dioxide blended into asphalt paving mixtures at the time of construction. This method has not seen widespread acceptance or practical implementation yet for a number of reasons.

One key disadvantage of the method described above is its limitation to usage in freshly placed asphalt surfaces, reducing its economic viability for existing roadbeds that are structurally sound, which comprise a large percentage of the roadbeds that would be most subject to violating the forthcoming EPA guidelines. The tremendous cost that would be created by replacing these roadbeds with new asphalt surface would be prohibitive, both in terms of dollar cost and user delays.

Another key disadvantage of the method described above is the cost of constructing new asphalt roads with photocatalytic oxidation (PCO) technology. Blending the $TiO_2$ photocatalyst into an entire asphalt paving mixture can be cost prohibitive due to the amount of $TiO_2$ photocatalyst that must be incorporated into the asphalt to provide the desired reduction in pollutants. The amount of $TiO_2$ photocatalyst dispersed within the asphalt surface would need to be of sufficient concentration to allow for exposure of an amount of the upper layers of the asphalt that could be exposed due to wear off. Since the $TiO_2$ photocatalyst would be mixed into the asphalt surface homogenously, portions of the asphalt road that will never be exposed to the environment would have $TiO_2$ photocatalyst.

Another method of photocatalytic oxidation that has been studied is the topical application of a surface layer of titanium dioxide sprayed on an existing asphalt surface. While laboratory and field tests show that this method can reduce up to 70% of pollutants in the short-term, it is expected that it will have limited effectiveness after the topical layer of photocatalyst wears off through traffic and environmental factors.

Accordingly, it is the object of the present technology to provide a method of embedding photocatalytic titanium dioxide into existing asphalt pavements to reduce the production of $NO_x$ and other harmful pollutants without the prohibitive cost and disruption of removing and placing new asphalt. Further, the $TiO_2$ photocatalyst should penetrate to a sufficient depth within the asphalt to ensure that the uppermost layer of the asphalt regenerates the $TiO_2$ photocatalyst on its surface, as the surface layers wear away.

It is another object of the present technology to provide an in-depth asphalt surface sealing method that restores the plasticity and durability of the asphalt binders included in the asphalt surface and protects the asphalt surface from damage from water and other environmental and chemical degradation. Furthermore, when the present method of embedding photocatalytic titanium dioxide is performed on existing warm mix asphalt pavements, the warm mix asphalt pavements gain improved resistance to premature fracturing.

The present technology is a method of embedding photocatalytic $TiO_2$ nanoparticles into asphalt surfaces. It is envisioned that the process may be used for all asphalt surfaces such as roads and highways. The introduction of the $TiO_2$ photocatalyst is by impregnation of the $TiO_2$ photocatalyst into asphalt surfaces using specialized multi-purpose asphalt preservation products (e.g., a carrier fluid), resulting in a photocatalytic reactive layer at the surface of the structure and a uniform distribution of $TiO_2$ nanoparticles in the upper layers of the asphalt to depths as great as three-eighths (0.375) inches. In other embodiments, the $TiO_2$ photocatalyst is uniformly distributed into the asphalt up to a depth range of approximately half an inch (0.5 inches) to approximately a quarter of an inch (0.25 inches), inclusive.

For context, $TiO_2$ is a semiconductor material that when exposed to ultraviolet (UV) radiation, as from sunlight, expels an electron from the valence band to the conduction band, leaving behind a positively charged hole. In the presence of water, as in atmospheric humidity, these positively charged holes create hydroxyl radicals as shown:

$$OH^- + h^+ \rightarrow {}^*OH.$$

The hydroxyl radicals in turn oxidize nitrogen oxides as follows:

$$NO + {}^*OH \rightarrow NO_2 + H^+$$

$$NO_2 + {}^*OH \rightarrow NO_3^- + H^+$$

Other reactive effects occur with volatile organic compounds (VOC) and some other pollutants. Since $TiO_2$ functions as a catalyst and is not consumed in the reaction, the photocatalytic effect continues. If the $TiO_2$ is in place at the surface of an asphalt roadway, it removes a significant quantity of $NO_x$ and VOCs from the environment nearest their source. If $TiO_2$ is uniformly impregnated into the asphalt to a given depth the pollution-reducing capability of the asphalt will automatically and continuously self-regenerate as the surface layers are subjected to the normal wear of traffic and other environmental factors.

The present technology impregnates the asphalt surface with $TiO_2$ by applying specialized penetrating carrier liquid(s) to the surface of an asphalt surface. These carriers are designed and proven to carry chemicals into asphalt. The $TiO_2$ is blended into the carrier liquids at a proportion that will result in a uniform distribution of $TiO_2$ nanoparticles throughout the upper three-eights (0.375) inches of the asphalt surface (or alternatively at least a quarter to half an inch in depth).

Examples of carrier liquids that may be used for this purpose are [A.R.A.-1-Ti, JOINTBOND Ti, Dust Bond Ti, and Ti-intro CME] *A.R.A.-1-TI®, JOINTBOND TI®, DUST BOND TI®, and TI-INTRO CME®*, all of which are manufactured by Pavement Technology, Inc., and/or D & D Emulsions, Inc. *and include cocamidopropyl betaine-based carrier liquids, petroleum emulsions, and petroleum resin emulsions. The description of carrier liquids referred to as A.R.A.-1-TI®, JOINTBOND TI®, DUST BOND TI®, and TI-INTRO CME® trademarks are provided in trademark registration certificates Nos. 4425146, 4425147, 4425149, and a material safety datasheet for a cocamidopropyl betaine-based carrier liquid, the carrier liquid referred by JOINTBOND TI® is described in the product datasheet entitled 'JOINTBOND', which is available from http://web.archive.org/web/20121110165204/http://pavetechinc.com/jointbond-asphalt-maintenance.asp, the carrier liquid referred by DUST BOND TI® is described in the product datasheet entitled 'DUST BOND', which is available from http://web.archive.org/web/20121110165159/http://pavetechinc.com/dustbond-soil-stabilizer.asp, the carrier liquid referred by A.R.A.-1-TI® is described in the product datasheet entitled 'A.R.A.-1 Ti® pollution-reducing polymerized rejuvenating seal', the carrier liquid referred by TI-INTRO CME® is described in the product datasheet entitled 'Ti-IntroCME™ pollution-reducing penetrant', which are incorporated herein by reference.* Most of these carrier liquids have the added benefit of restoring the plasticity and durability of the asphalt binder and protecting the asphalt surface from water damage, chloride ion penetration, deicing salts, and freeze/thaw damage.

For example, warm mix asphalt typically contains an additive that allows the warm mix asphalt to be produced and applied at lower temperatures than traditional asphalt. The lower temperature offers lower consumption of fossil fuels and greater flexibility when transporting and laying the mix. Applying the present technology to provide a method of embedding photocatalytic titanium dioxide into existing warm mix asphalt provides the added benefit of improving resistance to premature fracturing.

The present technology utilizes an anatase powder form of $TiO_2$ nanoparticles at a specific concentration that will result in $TiO_2$ being delivered at the designed rate of application for the impregnated region. It will be understood that other penetrating liquid carriers and/or forms of $TiO_2$, other semiconductors that are photocatalytic and alternate concentration levels, can be employed as deemed suitable by one of ordinary skill in the art.

In one embodiment, an asphalt surface treatment compound is created by mixing together any of the carrier liquids described above with a set amount of $TiO_2$ nanoparticles.

The asphalt surface treatment compound is sprayed onto horizontal road surfaces by a distributor truck with a spray bar of variable length, two to three inches in diameter, utilizing industry standard No. 1 to No. 3 nozzles. The application rate is controlled by a computerized flow manager, which allows the asphalt surface treatment compound to be precisely applied to the road surface, ensuring that the amount of asphalt surface treatment compound applied to the asphalt is sufficient to penetrate to a desired depth.

Once the flow rate computer has been set to the desired application rate, the application of the asphalt surface treatment compound is very accurate due to the computer control of the flow, regardless of travel speed variations of the sprayer. On other surfaces inaccessible to a distributor truck with spray bar, the asphalt surface treatment compound can be applied by hand spraying with a wand, or any other suitable means of application that maintains the required accuracy.

If conditions for a given application dictate that an asphalt pavement be textured for safety or other reasons, abrasive media application methods can be employed prior to spray application of the asphalt surface treatment compound. Exemplary methods are the Skidabrader process and conventional shot blasting, and the like.

In some embodiments, the amount of asphalt surface treatment compound (e.g., carrier compound plus photocatalytic material) that is applied to an asphalt surface should be enough to penetrate asphalt surface down to between a depth range of approximately a quarter of an inch to approximately a half of an inch, inclusive. Further, a concentration of photocatalytic material within the asphalt surface treatment compound should be sufficient to achieve a desired concentration of the photocatalytic material within the asphalt surface. This process of delivering photocatalytic material using a penetrating carrier compound is referred to as distributive embedding.

The depth to which the photocatalytic material should be distributively embedded may depend upon a variety of factors such as aggregate composition of the asphalt surface. By example, the photocatalytic material may only need to penetrate up to one quarter of an inch for asphalt surface that includes an aggregate that resists wear off, whereas an asphalt surface that is known to wear off quickly may require photocatalytic material to be embedded further into the asphalt surface to account for additional wear. Other factors may include expected or average traffic or use patterns that may predict wear off rates, as well as weather information. Other factors that would be apparent to one of ordinary skill in the art are also likewise contemplated for use.

Thus, in some instances, it is required to calculate an amount of asphalt surface treatment compound of the present technology, which will be required to penetrate the asphalt surface down to a sufficient depth relative to an upper surface of the asphalt surface. The examples of factors that affect wear off may be used as a part of this calculation. For example, if it is determined that based upon asphalt surface composition and traffic pattern that an average wear off of 0.005 inches per years is expected, and the lifespan of the road is forty years, the asphalt surface treatment compound should be applied so as to penetrate to a depth of at least one quarter of an inch, as the expected wear off would be 0.2 inches over the forty years.

FIG. 1 is a flowchart of an exemplary method of treating *an* asphalt surface to reduce the production of nitrogen oxides ($NO_x$), volatile organic compounds (VOC), and other pollutants [by] *in proximity to* the asphalt surface.

The method optionally includes preparing 105 the asphalt surface, if necessary, to remove surface contaminates to ensure that the compounds of the present technology can adhere to and penetrate the asphalt surface.

In some embodiments, the method optionally includes texturing 110 the upper surface of the asphalt surface. Again, this includes, for example, using an abrasive technique to prepare the surface of the asphalt surface.

The method also comprises applying 115 an amount of an asphalt surface treatment compound to an upper surface of the asphalt surface (e.g., asphalt roadway or highway for example). As mentioned above, the asphalt surface treatment compound comprises a mixture of a liquid carrier compound with a titanium dioxide ($TiO_2$) photocatalyst. In some instances, the $TiO_2$ photocatalyst is an anatase powder form of $TiO_2$ nanoparticles that is mixed into a liquid carrier compound.

The method includes allowing 120 the treated asphalt surface to dry for a period of time.

FIG. 2 is a method for preparing the asphalt surface treatment compound that includes calculating 205 an amount of asphalt surface treatment compound that is necessary to ensure that the asphalt surface is penetrated and embedded with photocatalytic material to a sufficient depth.

The method also includes selecting 210 a photocatalytic material for the asphalt surface treatment compound that is capable of reducing an amount of nitrogen oxides ($NO_x$) and volatile organic compounds (VOC) produced [by] *in proximity to* the asphalt surface.

The method also includes selecting 215 a carrier liquid for the asphalt surface treatment compound that is capable of penetrating and delivering the photocatalytic material to a sufficient depth of the asphalt surface. In some embodiments, the method includes mixing 220 the asphalt surface treatment compound by combining a liquid carrier compound with an amount of the selected photocatalytic material.

Figure 3:
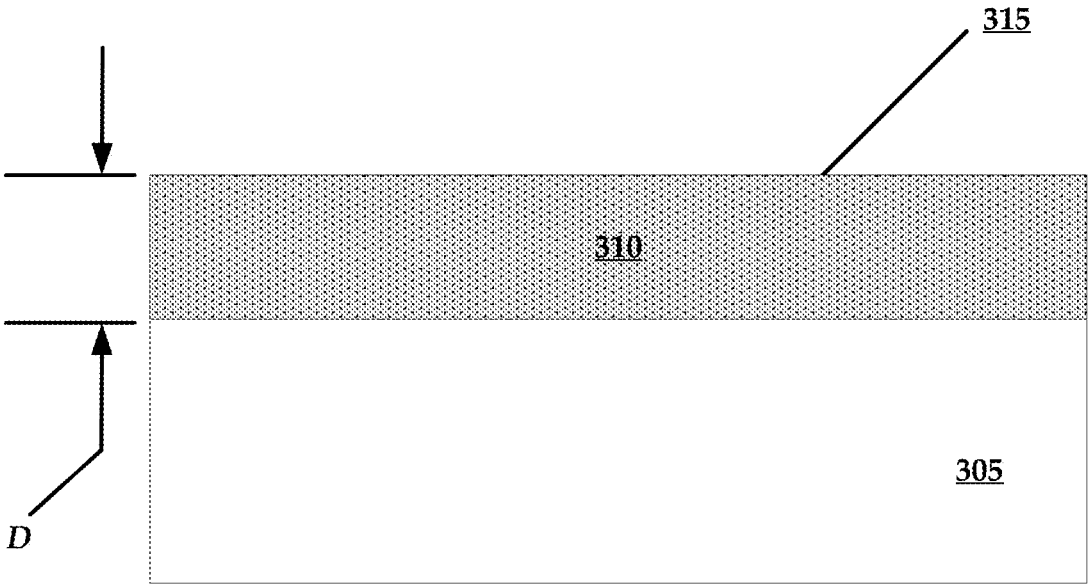
FIG. 3 is a cross sectional view of a treated section of asphalt surface.

FIG. 3 illustrates an asphalt surface section 305 that has been treated with an asphalt surface treatment compound 310. The asphalt surface section 305 is shown as having an upper surface 315. The amount of asphalt surface treatment compound 310 has penetrated down from the upper surface 315 to a depth D. This depth D can range anywhere between at least a quarter of an inch, down to half an inch. Other depths may also be utilized and can vary according to design requirements and usage.

While the present technology has been described in connection with a series of steps, these descriptions are not intended to limit the scope of the technology to the particular forms set forth herein. It will be further understood that the methods of the present technology are not necessarily limited to the discrete steps or the order of the steps described. To the contrary, the present descriptions are intended to cover such alternatives, modifications, and equivalents as may be included within the spirit and scope of the invention as defined by the appended claims and otherwise appreciated by one of ordinary skill in the art.

What is claimed is:

1. A method for treating a warm mix asphalt surface, the method comprising:

impregnating an upper surface of the warm mix asphalt surface with a mixture of a liquid asphalt carrier compound with a titanium dioxide ($TiO_2$) photocatalyst, the liquid asphalt carrier compound carrying titanium dioxide ($TiO_2$) nanoparticles into the upper surface of the warm mix asphalt surface, forming a photocatalytic layer within the warm mix asphalt surface that oxidizes nitrogen oxides (NOx) [and other pollutants] when the warm mix asphalt surface is exposed to ultraviolet sunlight and airborne water molecules, the liquid asphalt carrier compound penetrating the warm mix asphalt surface to a depth range of between approximately a quarter of an inch to approximately a half of an inch, as measured from the upper surface of the warm mix asphalt surface, so as to embed the titanium dioxide ($TiO_2$) photocatalyst in the asphalt surface and to ensure that as the upper surface of the warm mix asphalt surface wears off, the photocatalytic layer appears on the warm mix asphalt surface.

2. The method according to claim 1, further comprising texturing the upper surface of the warm mix asphalt surface.

3. The method according to claim 1, wherein the $TiO_2$ photocatalyst comprises an anatase powder form of $TiO_2$ nanoparticles that is mixed into the liquid asphalt carrier compound.

4. A method, comprising:

impregnating an upper surface of a warm mix asphalt surface with a photocatalytic compound, *the photocatalytic compound* including a liquid asphalt carrier compound *and a titanium dioxide (TiO2) photocatalyst, the titanium dioxide TiO2) photocatalyst including titanium dioxide (TiO2) nanoparticles, the liquid asphalt carrier compound* carrying *the* titanium dioxide ($TiO_2$) nanoparticles into the upper surface of the warm mix asphalt surface, forming a photocatalytic layer within the warm mix asphalt surface that oxidizes nitrogen oxides (NOx) [and other pollutants] when the warm mix asphalt surface is exposed to ultraviolet sunlight and airborne water molecules, in which the impregnation allows the photocatalytic compound to penetrate the warm mix asphalt surface down to a depth of at least a quarter of an inch relative to the upper surface of the warm mix asphalt surface, the liquid asphalt carrier compound being combined with [a] *the* titanium dioxide ($TiO_2$) photocatalyst so as to embed the titanium dioxide ($TiO_2$) photocatalyst in the warm mix asphalt surface and to ensure that as the upper surface of the warm mix asphalt surface wears off, a submerged layer of the titanium dioxide ($TiO_2$) photocatalyst appears on the warm mix asphalt surface.

5. The method according to claim 4, further comprising selecting an asphaltic carrier liquid for the photocatalytic compound that reduces an amount of nitrogen oxides (NOx) and volatile organic compounds (VOC).

6. The method according to claim 4, wherein the $TiO_2$ photocatalyst comprises an anatase powder form of $TiO_2$ nanoparticles.

7. The method according to claim 4, wherein the liquid asphalt carrier compound improves resistance to premature fracturing of the warm mix asphalt surface.

8. The method according to claim 4, further comprising calculating an amount of [warm mix asphalt surface treatment] *the liquid asphalt carrier* compound that is necessary to ensure that the warm mix asphalt surface is penetrated and embedded with *the* photocatalytic [material] *compound* to a [sufficient] *predetermined* depth.

9. A warm mix asphalt surface treatment compound, comprising: an amount of an asphaltic liquid carrier compound mixed with an amount of a titanium dioxide ($TiO_2$) photocatalyst, wherein the asphaltic liquid carrier compound penetrates a warm mix asphalt surface down to a depth of at least a quarter of an inch relative to an upper surface of the warm mix asphalt surface, the liquid carrier compound impregnating the warm mix asphalt surface.

10. The warm mix asphalt surface treatment compound according to claim 9, wherein the $TiO_2$ photocatalyst comprises an anatase powder form of $TiO_2$ nanoparticles.

11. The warm mix asphalt surface treatment compound according to claim 10, wherein the asphaltic liquid carrier compound restores plasticity and durability of an asphalt binder of the warm mix asphalt surface.

12. The warm mix asphalt surface treatment compound according to claim 10, wherein the asphaltic liquid carrier compound improves resistance to premature fracturing of the warm mix asphalt surface.

* * * * *